(12) United States Patent
Etonye

(10) Patent No.: US 10,308,222 B2
(45) Date of Patent: *Jun. 4, 2019

(54) VEHICLE SECURITY SYSTEM

(71) Applicant: Nzube John Etonye, West Covina, CA (US)

(72) Inventor: Nzube John Etonye, West Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,135

(22) Filed: Apr. 30, 2018

(65) Prior Publication Data

US 2018/0244241 A1    Aug. 30, 2018

Related U.S. Application Data

(63) Continuation of application No. 15/252,149, filed on Aug. 30, 2016, now Pat. No. 10,017,156.

(51) Int. Cl.
*B60R 25/10* (2013.01)
*B60R 25/30* (2013.01)
(Continued)

(52) U.S. Cl.
CPC .............. *B60R 25/305* (2013.01); *B60R 1/00* (2013.01); *B60R 1/04* (2013.01); *B60R 25/042* (2013.01); *B60R 25/08* (2013.01); *B60R 25/104* (2013.01); *B60R 25/31* (2013.01); *B60R 25/32* (2013.01); *B60R 25/33* (2013.01); *G06K 9/00771* (2013.01); *G06K 9/00832* (2013.01); *H04N 7/181* (2013.01); *B60R 25/102* (2013.01); *B60R 25/1004* (2013.01); *B60R 2025/0405* (2013.01); *B60R 2025/0415* (2013.01);
(Continued)

(58) Field of Classification Search
None
See application file for complete search history.

(56) References Cited

U.S. PATENT DOCUMENTS 4,486,806 A * 12/1984 Mochida .............. G07C 9/0069
180/286
8,855,621 B2 * 10/2014 Chen ...................... H04W 4/00
455/412.1
(Continued)

FOREIGN PATENT DOCUMENTS

CN            102897094 A      1/2013

*Primary Examiner* — Julie B Lieu
(74) *Attorney, Agent, or Firm* — Plager Schack LLP; Mark H. Plager; Michael J. O'Brien

(57) ABSTRACT

A vehicle security system for monitoring a vehicle and notifying a user includes at least two image capture devices (ICD), sensors, a global positioning system tracking module (GPSTM), a control module (CM), and a monitoring device. The ICD are positioned at predetermined locations of the vehicle for capturing and transmitting images of a target object. The sensors generate sensor data variables based on a detection of the target object. The GPSTM generates and transmits signals based on a position of the vehicle to a monitoring device. The CM receives the captured images and sensor data variables. The CM analyzes the received images and sensor data variables based on predefined criteria to trigger auxiliary units. The CM transmits the images and sensor data variables based on the predefined criteria to the monitoring device. A graphical user interface displays the images for monitoring the vehicle and notifies the user.

23 Claims, 2 Drawing Sheets

(51) Int. Cl.
*B60R 1/04* (2006.01)
*B60R 25/042* (2013.01)
*B60R 25/08* (2006.01)
*B60R 25/104* (2013.01)
*B60R 25/31* (2013.01)
*B60R 25/32* (2013.01)
*B60R 25/33* (2013.01)
*G06K 9/00* (2006.01)
*H04N 7/18* (2006.01)
*B60R 1/00* (2006.01)
*B60R 25/102* (2013.01)
*B60R 25/04* (2013.01)

(52) U.S. Cl.
CPC . *B60R 2025/1016* (2013.01); *B60R 2300/105* (2013.01); *B60R 2300/302* (2013.01); *B60R 2300/8006* (2013.01); *B60R 2300/8073* (2013.01)

(56) References Cited

U.S. PATENT DOCUMENTS

| | | | |
|---|---|---|---|
| 9,319,639 | B1 | 4/2016 | Englander et al. |
| 2003/0206102 | A1 | 11/2003 | Joao |
| 2006/0287821 | A1 | 12/2006 | Lin |
| 2007/0115099 | A1* | 5/2007 | Hamada ................ B60K 37/02 340/426.1 |
| 2008/0234878 | A1* | 9/2008 | Joao ...................... B60R 25/102 701/2 |
| 2009/0079829 | A1 | 3/2009 | Hu |
| 2009/0109008 | A1 | 4/2009 | Kuo |
| 2011/0080481 | A1 | 4/2011 | Bellingham |
| 2011/0149078 | A1* | 6/2011 | Fan .................. G08B 13/19669 348/152 |
| 2014/0306799 | A1* | 10/2014 | Ricci ...................... H04W 4/21 340/5.83 |
| 2016/0129788 | A1* | 5/2016 | Deegan ................ B60K 35/00 701/36 |
| 2016/0214535 | A1* | 7/2016 | Penilla .................. G06Q 20/18 |

* cited by examiner

VEHICLE SECURITY SYSTEM

RELATED APPLICATION

This application is a continuation of non-provisional patent application U.S. Ser. No. 15/252,149 filed on Aug. 30, 2016, the entire contents of which is herein incorporated by reference.

BACKGROUND

The invention disclosed herein generally relates to security systems. More particularly, the invention disclosed herein relates to a vehicle security system for monitoring a vehicle and notifying a user based on the occurrence of an event.

Vehicle security systems in general refer to electronic systems installed on vehicles to prevent theft or tampering of a vehicle. Traditionally, vehicle security systems track or recover stolen vehicles only in certain conditions, for example, vehicles that have been subject to accidents, stripped, dismantled, etc., when police are notified as stolen by the vehicle owner, depending on the time frame of the stolen incident. Typically, the vehicle owners receive email or text messages an hour or more after the vehicle is moved. The time delay involved provides a head start for the burglar to get away with the crime. Furthermore, the delay may result in police personnel resorting to high-speed vehicle chases, which unnecessarily damage public property. A vehicle security system, which instantly notifies a user or police personnel of a probable vehicle theft, is required. Moreover, existing vehicle security systems do not provide instantaneous image feeds of an intrusion attempt. This prevents users from viewing who intrudes or steals their valuables inside the vehicle or the vehicle itself. Conventional vehicle security systems are unable to capture vehicle jackers live, directly in the process, especially when the door is opened. Alternately, children or a person related to the user may unintentionally trigger the alarm of the vehicle security system.

If video feed of the event is viewed by the owner on a monitoring electronic device, such false alarms can be avoided. A vehicle security system, which provides live image feeds of an intrusion attempt, is required. Existing vehicle security systems do not provide communication system between the vehicle owner and the suspect inside the vehicle. A vehicle system which provides instant communication system between the vehicle owner and the vehicle intruder is required. Furthermore, existing vehicle security systems do not prevent the vehicle from starting by the vehicle owner or an authorized representative. A vehicle security system, which prevents the vehicle from starting, by the vehicle owner or an authorized representative, is required. Existing vehicle security systems do not stop vehicles during a police pursuit. A vehicle security system, which stops the vehicle during a police chase by police request is required. Hence, there is a long felt but unresolved need for vehicle security system, which instantly notifies a user or police personnel of a probable vehicle theft. Furthermore, there is a need for vehicle security system, which provides live image feeds of an intrusion attempt. Moreover, there is a need for a vehicle security system, which prevents the vehicle from starting by the vehicle owner or authorized representative. Also, there is a need for a vehicle system which provides instant communication system between the vehicle owner and the vehicle intruder. Additionally, there is a need for a vehicle security system which provides a live video feeds of a suspect and a communication system between the local authority and a suspect inside a stolen moving vehicle. Furthermore, there is a need for a vehicle security system which stop a vehicle during a police chase by police request without fear of an accident.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The invention disclosed herein addresses the above-mentioned need for a vehicle security system, which instantly notifies a user or police personnel of a probable vehicle theft. Furthermore, the invention addresses a need for a vehicle security system, which provides live image feeds of an intrusion attempt. Moreover, the invention addresses a need for a vehicle security system, which prevents the vehicle from starting. The vehicle security system for monitoring a vehicle and notifying a user based on the occurrence of an event disclosed herein includes at least two image capture devices, sensors, a global positioning system tracking module, a control module, and a monitoring device. The image capture devices are positioned at predetermined locations of a vehicle for capturing and transmitting images of a target object. The sensors are configured to generate a plurality of sensor data variables based on a detection of the target object. The global positioning system tracking module generates and transmits signals based on a position of the vehicle to a monitoring device. The control module receives the captured images of the target object and the generated sensor data variables. The control module is configured to analyze the received images and the received sensor data variables based on predefined criteria to trigger auxiliary units. The control module transmits the received images and the sensor data variables based on the predefined criteria to the monitoring device. The monitoring device is configured to receive the transmitted images and the sensor data variables from the control module. A graphical user interface of the monitoring device displays the images and the sensor data variables for monitoring the vehicle and notifies the user based on the occurrence of the event.

BRIEF DESCRIPTION OF THE FIGURES

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF CERTAIN EMBODIMENTS

Figure 1:
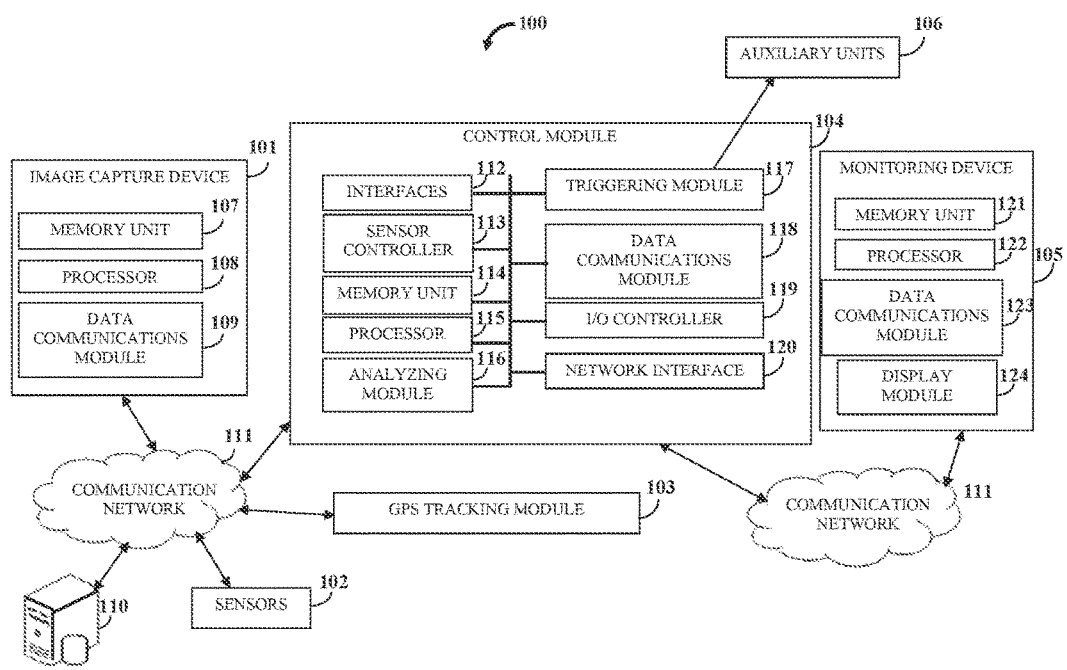
FIG. 1 exemplarily illustrates a schematic diagram of a vehicle security system.

FIG. 1 exemplarily illustrates a schematic diagram of a vehicle security system 100. The vehicle security system 100 for monitoring a vehicle and notifying a user based on the occurrence of an event disclosed herein includes at least two image capture devices 101, sensors 102, a global positioning system tracking module 103, a control module 104, and a monitoring device 105. The image capture devices 101 are positioned at predetermined locations of a vehicle for capturing and transmitting images of a target object. In an embodiment, an image capture device 101 is positioned underneath a dashboard area by the driver's side to capture images of a target object, for example, an intruder, a burglar, etc., if the target object tries to tamper with the ignition cables to start the vehicle. In an embodiment, a second image capture device 101 is positioned to capture facial features of the target object. The sensors 102 are configured to generate a plurality of sensor data variables based on a detection of the target object. The global positioning system tracking module 103 generates and transmits signals based on a position of the vehicle to a monitoring device 105. The control module 104 receives the captured images of the target object and the generated sensor data variables.

In an embodiment, a third image capture device 101 is installed on the rear of the vehicle. The image capture device 101 comprises a microphone for usual driving recording. Moreover, the image capture device 101 connects to the monitoring device 105 via a communication network 111 that implements, for example, Bluetooth® connectivity, Wi-Fi connectivity, etc. The image capture device 101 records exterior and interior images of the vehicle during driving or when a motion of the target object is detected by motion sensors 102. In an embodiment, the rear-view image capture device 101 replaces the vehicle's existing rear view mirror. A live video stream from the image capture devices 101 can be viewed from the monitoring device 105. Furthermore, the user can interact with a monitoring device 105 of a person in the vehicle, for example, parents monitoring and cautioning their children if they receive a speeding alert.

The control module 104 is configured to analyze the received images and the received sensor data variables based on predefined criteria to trigger auxiliary units 106. The control module 104 transmits the received images and the sensor data variables based on the predefined criteria to the monitoring device 105. The monitoring device 105 is configured to receive the transmitted images and the sensor data variables from the control module 104. A graphical user interface of the monitoring device 105 displays the images and the sensor data variables for monitoring the vehicle and notifies the user based on the occurrence of the event. Each of the image capture devices 101 comprises a memory unit 107, a processor 108, and a data communications module 109. The memory unit 107 is configured to store the captured one or more images of the target object. The processor 108 is communicatively coupled to the memory unit 107. The processor 108 is configured to execute the computer program instructions defined by modules of the image capture device 101. In an embodiment, the modules of the image capture device 101 comprise the data communications module 109 configured to process and transmit the captured images of the target object to one of a control module 104 and a server 110 via a communication network 111.

In an embodiment, the control module 104 comprises one or more interfaces 112, a sensor controller 113, a memory unit 114, at least one processor 115, an analyzing module 116, a triggering module 117, a data communications module 118, an I/O controller 119, and a network interface 120. The memory unit 114 is configured to store the generated sensor data variables. The processor 115 is communicatively coupled to the memory unit 114. The processor 115 is configured to execute computer program instructions defined by modules of the control module 104. The data communications module 118 is configured to receive the generated sensor data variables from the sensors 102 and the transmitted images of the target object from the image capture devices 101. The analyzing module 116 is configured to dynamically analyze the received sensor data variables and the received images of the target object to recognize a state of the vehicle based on previously stored sensor data variables retrieved from the memory unit 114. The triggering module 117 is configured to trigger the auxiliary units 106 operably coupled to the monitoring device 105 via the interfaces 112 based on the recognized state of the vehicle. The data communications module 118 is further configured to receive activation signals from the monitoring device 105.

The multiple interfaces 112 connect the sensors 102 to the control module 104 of the vehicle security system 100. The multiple interfaces 112 are, for example, one or more bus interfaces, a wireless interface, etc. The network interface 120 connects the control module 104 to the communication network 111. As used herein, "bus interface" refers to a communication system that transfers data between components inside a computing device and between computing devices. As used herein, the "monitoring device" is an electronic device, for example, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc.

In an embodiment, the electronic device is a hybrid device that combines the functionality of multiple devices. Examples of a hybrid electronic device comprise a cellular telephone that includes media player functionality, a gaming device that includes a wireless communications capability, a cellular telephone that includes game and electronic mail (email) functions, and a portable device that receives email, supports mobile telephone calls, has music player functionality, and supports web browsing. In an embodiment, computing equipment is used to implement applications such as media playback applications, for example, iTunes® from Apple Inc., a web browser, a mapping application, an electronic mail (email) application, a calendar application, etc. In another embodiment, computing equipment, for example, one or more servers are associated with one or more online services.

In another embodiment, the image capture devices 101, the sensors 102, the global positioning system (GPS) tracking module 103, and the monitoring device 105 are connected to the control module 104 via a communication network 111. The communications network 111 is a network, for example, the internet, an intranet, a wired network, a wireless network, a communication network that implements Bluetooth® of Bluetooth Sig, Inc., a network that implements Wi-Fi® of Wi-Fi Alliance Corporation, an ultrawideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the sensors 102 are, for example, proximity sensors, pressure sensors, temperature sensors, etc. The sensors 102 detect temperature, pressure, proximity, etc., of the target object. The sensors 102 generate multiple sensor data variables based on the temperature, pressure, proximity, etc., of the target object. In an embodiment, the sensors 102 detect the speed of the vehicle, extreme braking, mileage statistics, check engine light of the vehicle, receive vehicle's maintenance reminders, etc., and generates sensor data variables. The memory unit 114 stores the generated sensor data variables. The processor 115 is communicatively coupled to the memory unit 114. The processor 115 is configured to execute the computer program instructions defined by the modules of the control module 104 of the vehicle security system 100. The processors 108, 115, 122 refer to any one or more microprocessors, central processor (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 115 is implemented as a processor set comprising, for example, a programmed microprocessor and a math or graphics co-processor. The processor 115 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®)processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The vehicle security system 100 disclosed herein is not limited to employing a processor 115. In an embodiment, the vehicle security system 100 employs a controller or a microcontroller. The processor 115 executes the modules, for example, 116, 117, 118, 119, etc., of the vehicle security system 100. The analyzing module 116 analyzes the generated sensor data variables to recognize a state of the vehicle based on existing sensor data variables stored in the memory unit 114. The triggering module 117 triggers one or more auxiliary units 106 based on the recognized state of the vehicle or an input received from a user via the I/O controller 119. The auxiliary units 106 are, for example, headlamps, indicator lamps, tail lamps of the vehicle, electric horns, air horns, braking device, ignition system, etc., of the vehicle. In an embodiment, the data communications module 118 is configured to transmit the generated sensor data variables to a server 110 via the communication network 111. This enables remote access to data regarding the state of the vehicle. In an embodiment, the triggering module 117 transmits the necessary signals to the one or more auxiliary units 111 in response to sensor data variables received from the sensing devices 102. A user may set predefined criteria for the control module 104 to trigger the one or more auxiliary units 111. In an embodiment, the graphical user interface of the monitoring device 105 provides preset options to notify the user. The notification is triggered based on crossing any one, some, or all of threshold data, for example, set minimum distance from the vehicle, etc.

In an embodiment, the monitoring device 105 comprises a memory unit 121, a processor, a data communications module 123, and a display module 124. The memory unit 121 is configured to store the generated sensor data variables. The processor 122 is communicatively coupled to the memory unit 121. In an embodiment, the processor 122 is configured to execute computer program instructions defined by modules of the monitoring device 105. In an embodiment, the modules of the monitoring device 105 comprise a data communications module 123 and a display module 124. The data communications module 123 is configured to receive the generated sensor data variables and the transmitted images of the target object from the data communication module 118 of the control module 104. The data communication module 123 receives the signals transmitted by the global positioning system (GPS) tracking module 103. The display module 124 is configured to instantaneously display the received images of the target object on the graphical user interface of the monitoring device 105. The data communication module 123 is further configured to transmit the generated sensor data variables, the received GPS tracking module 103 signals, and an alert information based on the recognized state of the vehicle to a server 110 via a communication network 111.

In an embodiment, the server 110 is monitored by security personnel, for example, police personnel, etc. When a burglar or intruder opens or tampers with the vehicle, the auxiliary units 106 are triggered by the control module 104 and notifies the monitoring device 105 of the user by streaming images of the intruder on the graphical user interface. If the intruder is known to the user, the auxiliary units 106 are turned off Alternately, the user then instantly reports the incident to the concerned security personnel who immediately track down the vehicle. In an embodiment, one of the auxiliary units 106 is a braking device or an ignition system of the vehicle. The user or a third party additionally activates the braking device to stop the vehicle at police request to apprehend the intruder without high speed chase and fear of accident. Alternately, the ignition system is deactivated to prevent the vehicle from starting. In an embodiment, the auxiliary unit 106 is a fuel cut-off device. The user or a third party activates the fuel cut-off device to cut the vehicle's fuel/gas and stop the vehicle at police request.

Also, the vehicle's emergency lights automatically turn on when any of the auxiliary units 106 is activated, for safety reason which alerts the police when to slow down on a vehicle pursuit. Furthermore, in a situation where there is a network failure, for example, at an underground parking lot, etc., and the intruder takes off with the vehicle, the vehicle security system 100 picks up the signal, notifies the police personnel via the server 110, tracks down and stops the vehicle by police request through the monitoring staff. Police personnel can also know if the suspect is armed or not through the video. In an embodiment, the vehicle security system 100 locks or unlocks the vehicle from the monitoring device 105 via the control module 104. In an embodiment, the vehicle automatically locks if the vehicle key in not detected by the ignition after few minutes of being unlocked via the control module 104 of the vehicle security system 100. In another embodiment, the vehicle security system 100 starts the vehicle from the monitoring device 105 via the control module. In another embodiment, the vehicle security system 100 operates the vehicle's air conditioning system from the monitoring device 105 through the control module 104.

Figure 2:
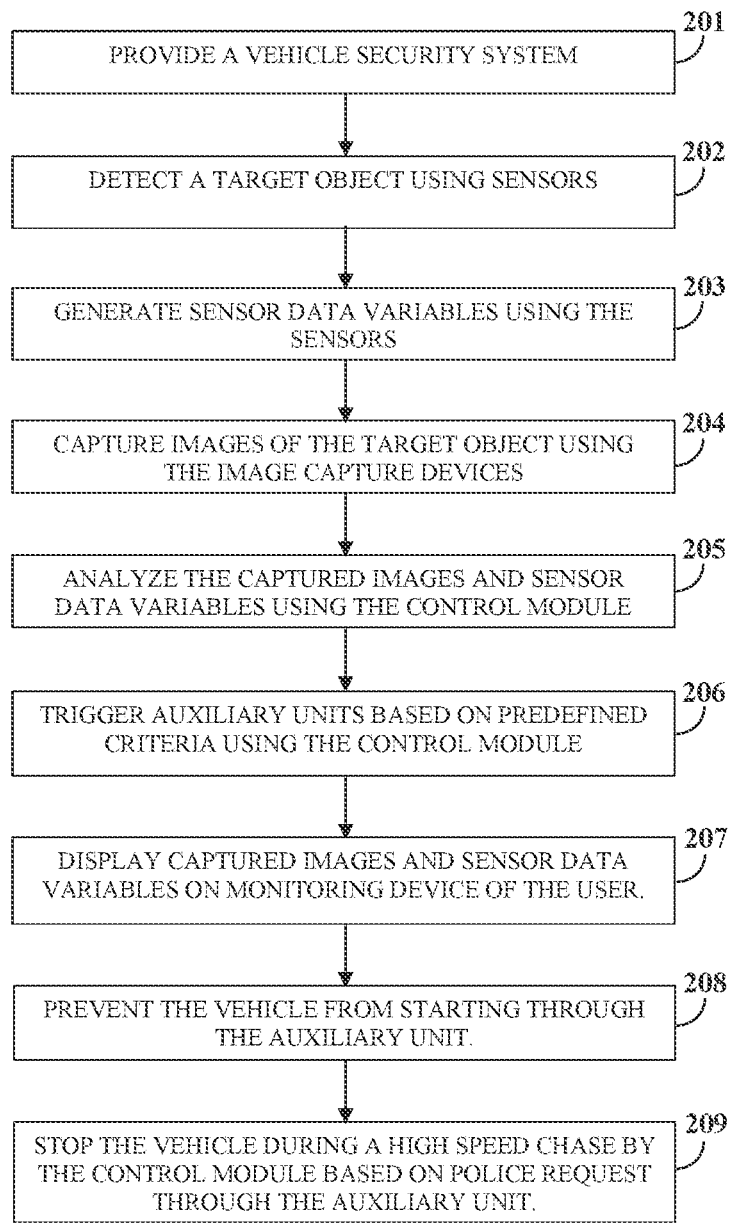
FIG. 2 exemplarily illustrates a method for monitoring a vehicle and notifying a user based on the occurrence of an event.

FIG. 2 exemplarily illustrates a method for monitoring a vehicle and notifying a user based on the occurrence of an event. In the method, disclosed herein, a vehicle security system 100 comprising at least two image capture devices 101, sensors 102, a global positioning system (GPS) tracking module 103, a control module 104, and a monitoring device 105, is provided 201. The image capture devices 101 are positioned at predetermined locations of the vehicle. A target object is detected 202 using the sensors. Sensor data variables are generated 203 using the sensors. Images of the target object are captured 204 using the image capture devices 101. The captured images and sensor data variables are analyzed 205 using the control module 104. One or more auxiliary units 106 are triggered 206 based on predefined criteria using the control module 104. The captured images and sensor data variables are displayed 207 on a graphical user interface of the monitoring device 105 of the user. The vehicle is prevented 208 from starting by the one or more auxiliary units 106. Moreover, the vehicle is stopped 209 during a high-speed chase by the control module 104 based on police request through the auxiliary units 106.

The foregoing examples have been provided merely for the purpose of explanation and are in no way to be construed as limiting of the vehicle security system 100, disclosed herein. While the vehicle security system 100 has been described with reference to various embodiments, it is understood that the words, which have been used herein, are words of description and illustration, rather than words of limitation. Further, although the vehicle security system 100 has been described herein with reference to particular means, materials, and embodiments, the vehicle security system 100 is not intended to be limited to the particulars disclosed herein; rather, the vehicle security system 100 extends to all functionally equivalent structures, methods and uses, such as are within the scope of the appended claims. Those skilled in the art, having the benefit of the teachings of this specification, may affect numerous modifications thereto and changes may be made without departing from the scope and spirit of the vehicle security system 100 disclosed herein in their aspects.

What is claimed is:

1. A vehicle security system for monitoring a vehicle and notifying a user based on an occurrence of an event, the vehicle security system comprising:
at least two image capture devices positioned at predetermined locations of the vehicle for capturing and transmitting at least one image of a target object;
a control module for receiving the at least one image of the target object; wherein the control module configured to analyze the at least one image of the target object based on predefined criteria to trigger a plurality of auxiliary units, wherein the control module transmits the at least one image based on the predefined criteria to a monitoring device; wherein at least one speed sensor determines a detected speed of the vehicle and the monitoring device is configured to receive the at least one image and the detected speed of the vehicle from the control module, wherein a graphical user interface of the monitoring device displays the at least one image of the target object and the detected speed of the vehicle for monitoring the vehicle and notifying the user based on the occurrence of the event;
wherein the detected speed of the vehicle alerts a third image capture device for some seconds, wherein the third image capture device automatically sends a live video alert to the monitoring device of the user.

2. The vehicle security system of claim 1, wherein the event is one of a tampering of the vehicle and an attempted theft of the vehicle.

3. The vehicle security system of claim 1, wherein the target object is one of a burglar and an intruder.

4. The vehicle security system of claim 1, further comprising:
a plurality of sensors configured to generate a plurality of sensor data variables based on a detection of the target object;
wherein plurality of the plurality of sensors are selected from a sensor group consisting of proximity sensors, temperature sensors, pressure sensors, sensors for detecting target objects, extreme braking, mileage statistics, check engine light of the vehicle, and receiving vehicle maintenance reminders.

5. The vehicle security system of claim 1, further comprising:
a global positioning system tracking module for generating and transmitting signals based on a position of the vehicle to the monitoring device.

6. The vehicle security system of claim 1, wherein the plurality of auxiliary units includes at least one member of an auxiliary unit set consisting of: a visual notification device, an audio notification device, a braking device, an ignition system of the vehicle, and a fuel cut-off device.

7. The vehicle security system of claim 6, wherein the visual notification device is emergency lights configured to automatically turn on when the braking device, the ignition system of the vehicle, and the fuel cut-off device is activated to alert police personnel when to slow down on a vehicle pursuit.

8. The vehicle security system of claim 6, wherein the user or a third party activates the fuel cut-off device to cut fuel/gas in the vehicle and stop the vehicle at police request.

9. The vehicle security system of claim 6, wherein the audio notification device is one of electric horns, air horns of the vehicle, and ringing tones/alerts of the monitoring device.

10. The vehicle security system of claim 6, wherein the visual notification device is one of headlamps, indicator lamps, tail lamps of the vehicle, and a live video recording on the monitoring device.

11. The vehicle security system of claim 6, wherein the monitoring device is one of a smart phone, a tablet, a laptop, a personal computer, a smart watch, and a smart TV.

12. The vehicle security system of claim 1, wherein the user is able to locks and unlocks the vehicle from the monitoring device using the control module of the vehicle security system.

13. The vehicle security system of claim 1, wherein the vehicle is automatically locked if a key of the vehicle is not detected by an ignition after few minutes of being unlocked by the control module.

14. The vehicle security system of claim 1, wherein the vehicle is started from the monitoring device through the control module of the vehicle security system.

15. The vehicle security system of claim 1, wherein an air conditioning system of the vehicle is operated from the monitoring device through the control module.

16. The vehicle security system of claim 1, wherein one of the at least two image capture devices is positioned underneath a dashboard area by a driver's side to capture images of the target object trying to tamper with ignition cables to start the vehicle.

17. The vehicle security system of claim 1, wherein one of the at least two image capture devices is positioned to capture facial features of the target object.

18. The vehicle security system of claim 1, wherein one of the at least two image capture devices is installed on the front and back of a portable rear view mirror of the vehicle, wherein one of the at least two image capture devices comprises a microphone and a speaker for recording exterior and interior images of the vehicle during driving or when a motion of the target object is detected by a motion sensor.

19. The vehicle security system of claim 1, wherein one of the at least two image capture devices replaces an existing rear view mirror in the vehicle.

20. The vehicle security system of claim 1, wherein each of the at least two image capture devices comprises:
   a first non-transitory computer readable storage medium configured to store the at least one image of the target object; and
   at least one first processor communicatively coupled to the first non-transitory computer readable storage medium, the at least one first processor configured to execute computer program instructions defined by modules of one of the at least two image capture devices, the modules of one of the at least two image capture devices comprising:
   a first data communication module configured to process and transmit the at least one image of the target object to one of communication set consisting of the control module and a server via a communication network.

21. The vehicle security system of claim 1, wherein the control module comprises:
   a second non-transitory computer readable storage medium configured to store at least one generated sensor data variables; and
   at least one second processor communicatively coupled to the second non-transitory computer readable storage medium, the at least one second processor configured to execute computer program instructions defined by modules of the control module, the modules of the control module comprising:
   a second data communication module configured to receive generated sensor data variables from at least one sensor and the at least one image of the target object from the at least two image capture devices;
   an analyzing module configured to dynamically analyze the generated sensor data variables and the at least one image of the target object to recognize a state of the vehicle based on previously stored sensor data variables retrieved from the second non-transitory computer readable storage medium;
   a triggering module configured to trigger the plurality of auxiliary units operably coupled to the monitoring device via one or more of a plurality of interfaces based on a recognized state of the vehicle; and
   the second data communication module further configured to receive activation signals from the monitoring device.

22. The vehicle security system of claim 1, wherein the graphical user interface is one of a wireless interface and a bus interface.

23. The vehicle security system of claim 1, wherein the monitoring device comprises:
   a third non-transitory computer readable storage medium configured to store generated sensor data variables; and
   at least one third processor communicatively coupled to the third non-transitory computer readable storage medium, the at least one third processor configured to execute computer program instructions defined by modules of the monitoring device, the modules of the monitoring device comprising:
   a third data communication module configured to receive the generated sensor data variables and the at least one image of the target object from a second data communication module of the control module, and wherein the third data communication module receives signals transmitted by a global positioning system tracking module;
   a display module configured to instantaneously display the at least one image of the target object on the graphical user interface of the monitoring device; and
   the third data communication module further configured to transmit generated sensor data variables, received global positioning system tracking module signals, and an alert information based on a recognized state of the vehicle to a server via a communication network.

* * * * *